United States Patent
Ahn et al.

(10) Patent No.: US 10,033,853 B2
(45) Date of Patent: Jul. 24, 2018

(54) RESTRICTING THE OPERATION OF AN ELECTRONIC DEVICE

(71) Applicant: Samsung Electronics Co., Ltd., Gyeonggi-do (KR)

(72) Inventors: Byung-Yoo Ahn, Gyeonggi-do (KR); Tae-Keun Oh, Seoul (KR); Jun-Kyu Kang, Seoul (KR); Su-Jin Kim, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 164 days.

(21) Appl. No.: 14/474,852

(22) Filed: Sep. 2, 2014

(65) Prior Publication Data

US 2015/0063338 A1 Mar. 5, 2015

(30) Foreign Application Priority Data

Aug. 30, 2013 (KR) ........................ 10-2013-0104345

(51) Int. Cl.
*H04L 12/28* (2006.01)
*H04M 1/725* (2006.01)
*H04L 29/12* (2006.01)
*H04W 4/02* (2018.01)
*H04W 4/90* (2018.01)
*H04W 84/12* (2009.01)
*H04W 88/06* (2009.01)

(52) U.S. Cl.
CPC .... *H04M 1/72577* (2013.01); *H04L 61/2038* (2013.01); *H04L 61/609* (2013.01); *H04M 1/72572* (2013.01); *H04W 4/02* (2013.01); *H04W 4/90* (2018.02); *H04W 84/12* (2013.01); *H04W 88/06* (2013.01)

(58) Field of Classification Search
CPC .... H04L 61/609; H04W 4/22; H04J 2211/005
See application file for complete search history.

(56) References Cited

U.S. PATENT DOCUMENTS

| 7,266,371 | B1* | 9/2007 | Amin | H04W 8/18 |
| | | | | 455/418 |
| 8,280,411 | B2* | 10/2012 | Chiashi | H04M 1/0241 |
| | | | | 455/456.1 |
| 8,949,720 | B1* | 2/2015 | Narayanan | G06F 3/0488 |
| | | | | 715/741 |
| 2005/0277428 | A1 | 12/2005 | Nathan Brown | |
| 2009/0170532 | A1* | 7/2009 | Lee | H04M 1/72566 |
| | | | | 455/456.3 |
| 2010/0042734 | A1* | 2/2010 | Olafsson | H04L 63/0236 |
| | | | | 709/229 |

(Continued)

FOREIGN PATENT DOCUMENTS

| EP | 2 321 757 B1 | 5/2011 | |
| EP | 2321757 A2 * | 5/2011 | ............. G06F 21/83 |

(Continued)

*Primary Examiner* — Frank Duong
(74) *Attorney, Agent, or Firm* — Cha & Reiter, LLC (57) ABSTRACT

A method is provided including: detecting an activation of an electronic device; detecting a current location of the electronic device; detecting whether the activation is prohibited at the current location of the electronic device; and shutting down the electronic device when the activation is prohibited.

20 Claims, 10 Drawing Sheets

(56) References Cited

U.S. PATENT DOCUMENTS

| | | | | |
|---|---|---|---|---|
| 2013/0331058 A1* | 12/2013 | Harvey | ............... | H04W 4/22 |
| | | | | 455/404.2 |
| 2014/0003261 A1* | 1/2014 | Glllett | ............... | H04W 48/04 |
| | | | | 370/252 |
| 2014/0004868 A1* | 1/2014 | Agardh | ............ | H04W 48/16 |
| | | | | 455/452.1 |
| 2015/0215844 A1* | 7/2015 | Davis | .................. | H04W 8/12 |
| | | | | 455/432.1 |

FOREIGN PATENT DOCUMENTS

| KR | 2001-0058751 A | 7/2001 |
|---|---|---|
| KR | 2001-0086805 A | 9/2001 |

\* cited by examiner

RESTRICTING THE OPERATION OF AN ELECTRONIC DEVICE

CLAIM OF PRIORITY

This application claims the benefit under 35 U.S.C. § 119(a) of a Korean patent application filed in the Korean Intellectual Property Office on Aug. 30, 2013 and assigned Serial No. 10-2013-0104345, the entire disclosure of which is hereby incorporated by reference.

FIELD OF THE DISCLOSURE

The present disclosure relates to electronic devices, and more particularly to a method and apparatus for restricting the operation of an electronic device

BACKGROUND

The operation of electronic devices may be restricted in various countries around the globe for reasons related to licensing. This puts the burden on device manufacturers to ensure that the devices that they sell in a particular country comply with that country's laws. Ensuring such compliance, however, can be difficult because there can be a large number of different electronic devices that are sold by a particular manufacturer in many different countries. Accordingly, the need exists for new techniques for ensuring that the electronic devices produced by a particular manufacturer comply with the local laws of the countries where they are sold.

SUMMARY

The present disclosure addresses this need. According to one aspect of the disclosure, a method is provided comprising: detecting an activation of an electronic device; detecting a current location of the electronic device; detecting whether the activation is prohibited at the current location of the electronic device; and shutting down the electronic device when the activation is prohibited.

According to another aspect of the disclosure, an electronic device is provided comprising a memory and a processor configured to detect an activation of the electronic device; detect a current location of the electronic device; detect whether the activation is prohibited at the current location of the electronic device; and shut down the electronic device when the activation is prohibited.

BRIEF DESCRIPTION OF THE DRAWINGS

The above and other aspects, features and advantages of certain exemplary aspects of the present disclosure will be more apparent from the following detailed description taken in conjunction with the accompanying drawings, in which.

DETAILED DESCRIPTION

Aspects of the present disclosure will be described herein below with reference to the accompanying drawings. In the following description, well-known functions or constructions are not described in detail since they would obscure the disclosure in unnecessary detail.

Hereinafter, a description will be given for an apparatus and method for verifying a current position of an electronic device and limiting an operation of the electronic device. Hereinafter, the electronic device includes at least one of a mobile communication terminal, a Personal Digital Assistant (PDA), a laptop computer, a smart phone, a netbook, a television, a Mobile Internet Device (MID), a Ultra Mobile Personal Computer (UMPC), a tablet PC, a navigation device, a digital refrigerator, a digital watch, a Moving Picture Experts Group (MPEG) layer 3 (MP3) player, and/or any other suitable type of electronic device.

Figure 1:
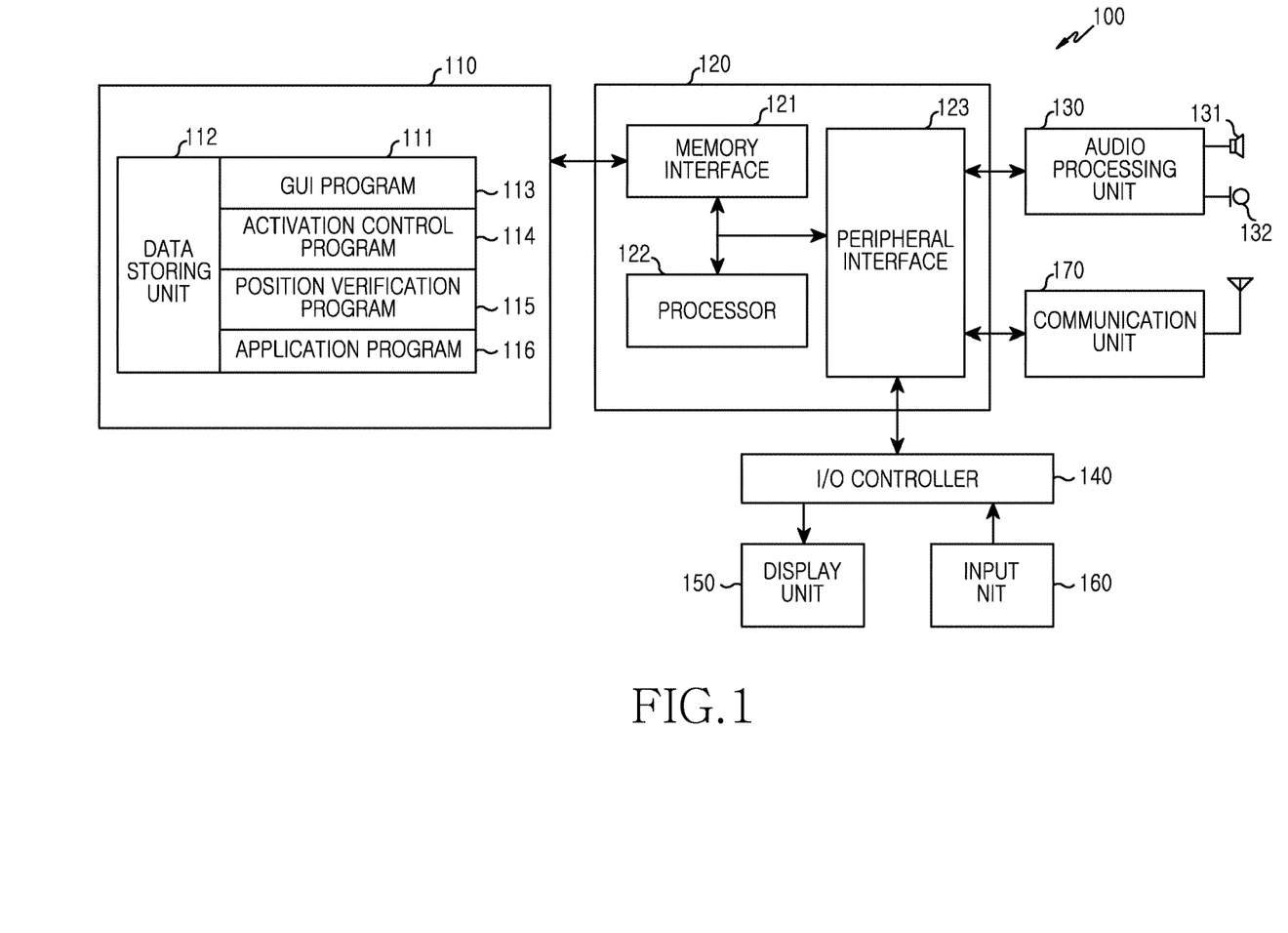
FIG. 1 is a block diagram illustrating an example of a configuration of an electronic device, according to aspects of the present disclosure.

FIG. 1 is a block diagram illustrating an example of a configuration of an electronic device, according to aspects of the present disclosure. An electronic device 100 is shown including a memory 110, a processor unit 120, an audio processing unit 130, an Input/Output (I/O) controller 140, a display unit 150, an input unit 160, and a communication unit 170. Herein, the memory 110 may be a plurality of memories.

The memory may include any suitable type of volatile and/or non-volatile memory (e.g., RAM, flash memory, SSD drive, hard drive, cloud storage, etc.) In some implementations, the memory 110 may include a program storing unit 111 for storing programs for controlling operations of the electronic device 100 and a data storing unit 112 for storing data generated while the programs are executed.

The program storing unit 111 includes a Graphic User Interface (GUI) program 113, an activation control program 114, a position verification program 115, and at least one application program 116. Herein, the programs included in the program storing unit 111 may be expressed in an instruction set as a set of instructions.

The data storing unit 112 may store processor-executable instructions which when executed by the device 100 cause the device 100 to identify the country where the device 100 is currently located. For example, the data storing unit 112 may store country information corresponding to code values corresponding to different countries. As another example, the data storing unit 112 may store country information corresponding to different coordinate values (e.g., values including latitude and longitude). As another example, the data storing unit 112 may store an Internet Protocol (IP) address allocated according to a corresponding country. In addition, the data storing unit 112 may store an activation completion history. Also, the data storing unit 112 may store a call history.

Figure 8A:
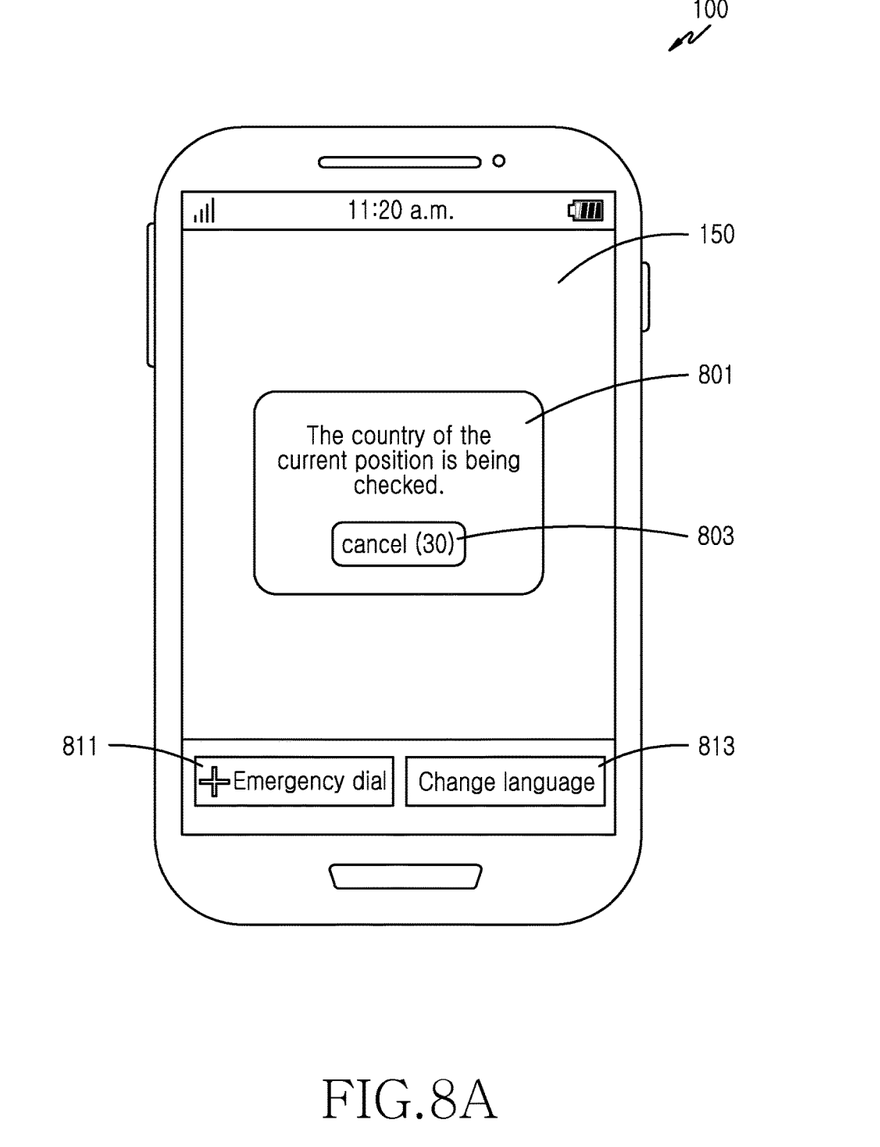
FIG. 8A and FIG. 8B are diagrams illustrating examples of screens that can be displayed when the processes of FIGS. 3-7B are executed, according to aspects of the disclosure.
Figure 8B:
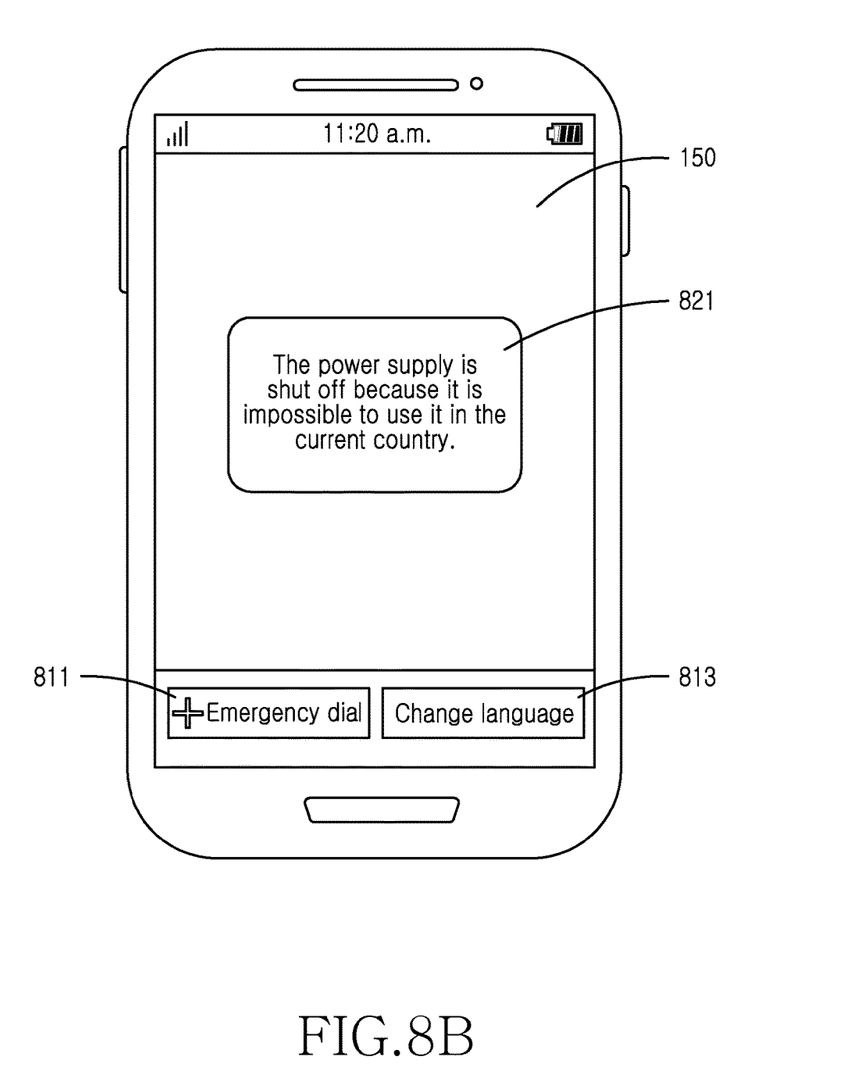

The GUI program 113 may include at least one software component for providing a UI as graphics on the display unit 150. For example, the GUI program 113 controls the display unit 150 to display information of an application program executed by the processor 122. As another example, the GUI program 113 may control, as shown in FIG. 8A, the display unit 150 to display a menu 801 for informing that a communication network is being searched according to a request of the position verification program 115. Herein, the GUI program 113 may include a cancel button 803 which may stop a search for a communication network on the menu 801. The GUI program 113 may control the display unit 150 to display a remaining time for a search for a communication network on the cancel button 803. In addition, the GUI program 113 may control, as shown in FIG. 8A, the display unit 150 to display an emergency call button 811 and a language change button 813. For another example, the GUI program 113 may control, as shown in FIG. 8B, the display unit 150 to display a menu 821 for informing the shutting-off of the power supply according to a request of the activation control program 114.

The activation control program 114 may include at least one software component for controlling an operation of the electronic device 100 in consideration of a current position of the electronic device 100. For example, when an activation event is generated, the activation control program 114 may verify a country corresponding to the current position of the device 100 through the position verification program 115. After identifying the country where the device 100 is currently located, the activation control program 114 may verify whether the country of the current position is an activation limit country. If the country of the current position is the activation limit country, the activation control program 114 may perform a control operation to shut off the power supply.

The position verification program 115 may include at least one software component for verifying a country of a current position of the electronic device 100. For example, when a current position confirmation request is received from the activation control program 114, the position verification program 115 may search a communication network and verify a country of a current position of the electronic device 100. Herein, the position verification program 115 may verify the country of the current position using a provider identification code of the searched communication network. As another example, when the communication network is not searched, the position verification program 115 may verify a current position of the electronic device 100 using a GPS. Herein, the position verification program 115 may verify a coordinate value including latitude and longitude. Herein, the position verification program 115 may verify the country of the current position using country information corresponding to each coordinate value including latitude and longitude. As another example, when the communication network is not searched, the position verification program 115 may verify a current position of the electronic device 100 using local-area wireless communication. For instance, when a Wireless-Fidelity (Wi-Fi) communication is activated, the position verification program 115 may search at least one Access Point (AP) through the communication unit 170 and attempt to access the searched AP. Thereafter, the position verification program 115 may receive one IP address through the accessed AP. Herein, the position verification program 115 may verify a country of a current position using the IP address allocated according to a corresponding country, which is stored in the data storing unit 112.

The application program 116 includes a software component for at least one application program installed in the electronic device 100. The application program may include a media player application, a game, and/or any suitable type of application.

The processor unit 120 may include a memory interface 121, at least one processor 122, and a peripheral interface 123. Herein, the memory interface 121, at least the one processor 122 and the peripheral interface 123 which are included in the processor unit 120 may be integrated in at least one Integrated Circuit (IC) or be separately implemented. The memory interface 121 may control access to the memory 110. The peripheral interface 123 may control connectivity with various peripheral devices.

Figure 2:
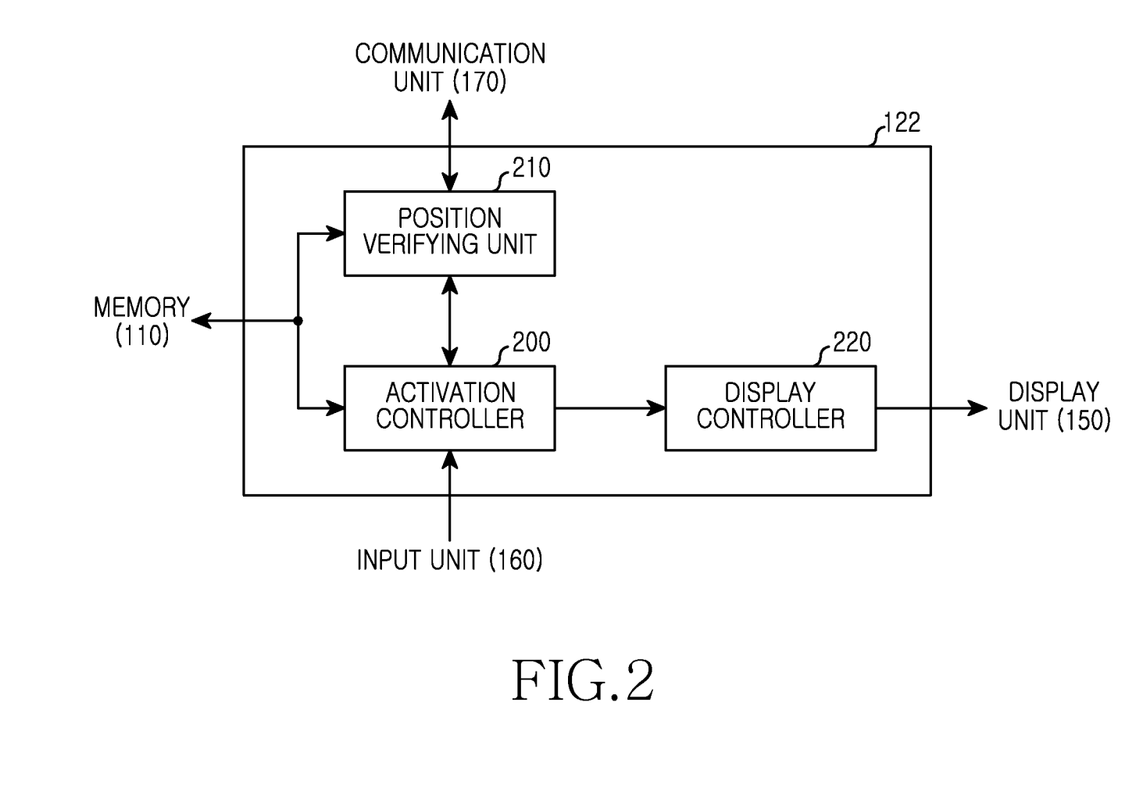
FIG. 2 is a block diagram illustrating an example of a configuration of a processor according to aspects of the present disclosure.

In operation, the processor 122 provides a variety of multimedia services using at least one software program. For example, the processor 122 may execute at least one program stored in the memory 110 and provide a service according to the corresponding program. For example, as shown in FIG. 2, the processor 122 may be configured to execute the activation control program 114, control an operation of the electronic device 100 in consideration of a current position of the electronic device 100, execute the position verification program 115, and verify a country of the current position.

The audio processing unit 130 may provide an audio interface between a user and the electronic device 100 through a speaker 131 and a microphone 132.

The I/O controller 140 may provide an interface between I/O devices, such as the display unit 150 and the input unit 160, and the peripheral interface 123.

The display unit 150 may display state information of the electronic device 100, characters input by the user, video, and still pictures. In one example, the display unit 150 may display information of an application program executed by the processor 122. In another example, the display unit 150 may display, as shown in FIG. 8A, a menu 801 indicating that a communication network is being searched according to control of the GUI program 113. For instance, the display unit 150 may include, as shown in FIG. 8A, a cancel button 803 which may stop a search for a communication network on the menu 801. The display unit 150 may display on the cancel button 803 an indication of projected time until completion of a search for a communication network. In addition, the display unit 150 may display, as shown in FIG. 8A, an emergency call button 811 and a language change button 813 according to control of the GUI program 113. As another example, the display unit 150 may display, as shown in FIG. 8B, a menu 821 for informing the shutting-off of the power supply according to control of the GUI program 113.

The input unit 160 may provide input data generated by selection of the user to the processor unit 120 through the I/O controller 140. Herein, the input unit 160 may include a touch input unit. Herein, the touch input unit may provide touch information to the processor unit 120 through the I/O controller 140.

The communication unit 170 may perform a communication function for voice and data communication. For example, the communication unit 170 may be classified into a plurality of communication sub-modules which support different communication networks. For example, the communication network may include, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, a Near Field Communication (NFC) network, and/or any other suitable type of network.

FIG. 2 is a block diagram illustrating an example of a configuration of the processor 122 according to aspects of the present disclosure. As illustrated in this example, the processor 122 may include an activation controller 200, a position verifying unit 210, and a display controller 220. Each of the activation controller 200, the position verifying unit 210, and a display controller 230, may include electronic circuitry configured to perform respective tasks. Although, in this example, the activation controller 200, the position verifying unit 210, and a display controller 230 are represented as discrete elements, in other examples two or more of them may be integrated together.

In some implementations, the activation controller 200 may include processing circuitry configured to execute the activation control program 114 and control an operation of the electronic device 100 in consideration of a current position of the electronic device 100. For example, when an activation event is generated, the activation controller 200 may verify a country of a current position of the electronic device 100 through the position verifying unit 210. Verifying the country of the current position from the position verifying unit 210, the activation controller 200 may verify whether the country of the current position is an activation limit country. According to aspects of the disclosure, an activation country may be any country in which the operation of the electronic device is restricted for some reason (e.g., for reasons related to licensing, etc.) If the country of the current position is an activation limit country, the activation controller 200 may perform a control operation to shut off the power supply.

The position verifying unit 210 may execute the position verification program 115 and verify a country of a current position of the electronic device 100. In one example, when a current position confirmation request is received from the activation controller 200, the position verifying unit 210 may search a communication network and verify a country of a current position of the electronic device 100. For instance, the position verifying unit 210 may verify the country of the current position using a provider identification code of the searched communication network. In another example, when the communication network is not searched, the position verifying unit 210 may verify a current position of the electronic device 100 using a GPS. Herein, the position verifying unit 210 may verify a coordinate value including latitude and longitude. Herein, the position verifying unit 210 may verify the country of the current position using country information corresponding to each coordinate value including latitude and longitude. In another example, the position verifying unit 210 may verify a current position using local-area wireless communication. For example, when a Wi-Fi communication is activated, the position verifying unit 210 may search at least one AP through the communication unit 170 and attempt to access the searched AP. Thereafter, the position verifying unit 210 may receive one IP address through the accessed AP. Herein, the position verifying unit 210 may verify a country of a current position of the electronic device 100 using the IP address.

The display controller 220 may execute the GUI program 113 stored in the program storing unit 111 and control the display unit 150 to display a UI. In one example, the display controller 220 may control the display unit 150 to display information of an application program executed by the processor 122. In another example, the display controller 220 may control, as shown in FIG. 8A, the display unit 150 to display a menu 801 for informing that a communication network is being searched according to a request of the position verifying unit 210. Herein, the display controller 220 may include, as shown in FIG. 8A, a cancel button 803 which may stop a search for a communication network on the menu 801. The display controller 220 may control the display unit 150 to display a remaining time for a search for a communication network on the cancel button 803. In addition, the display controller 220 may control, as shown in FIG. 8A, the display unit to display an emergency call button 811 and a language change button 813. In another example, the display controller 220 may control, as shown in FIG. 8B, the display unit to display a menu 821 for informing the shutting-off of the power supply according to a request of the activation controller 200.

In this example, the activation controller 200 of the electronic device 100 may execute the activation control program 114 and control the operation of the electronic device 100 in consideration of the current position of the electronic device 100. However, in other implementations, the electronic device 100 may include a separate activation control module including the activation control program 114.

Furthermore, in this example, the position verifying unit 210 of the electronic device 100 may execute the position verification program 115 and perform the control operation to verify the country of the current position. However, in other instances, the electronic device 100 may include a separate position verification module including the position verification program 115.

Figure 3:
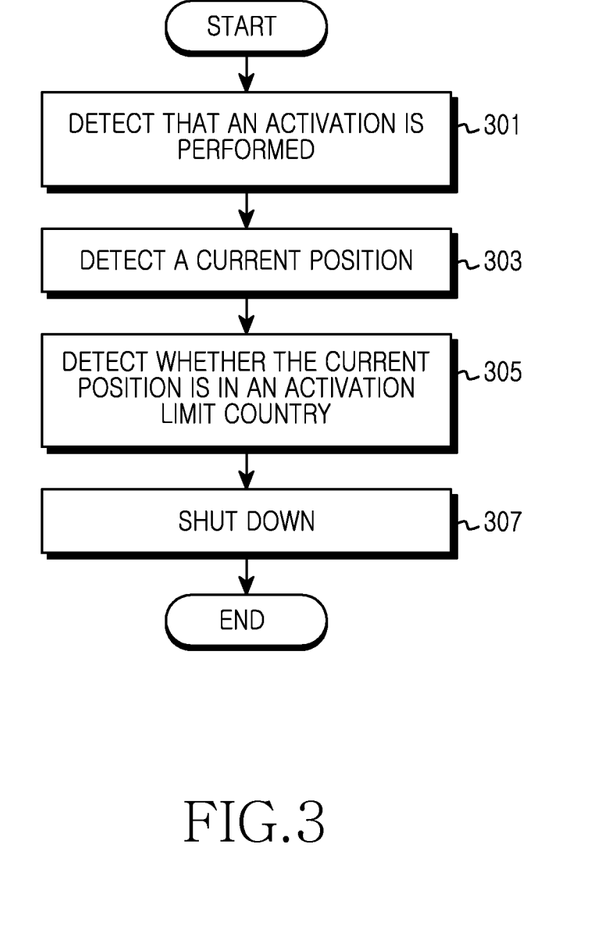
FIG. 3, FIG. 4, FIG. 5 and FIG. 6 are flowcharts illustrating examples of a process for restricting the operation of an electronic device, according to aspects of the disclosure.

FIG. 3 is a flowchart illustrating an example of a process for restricting the operation of an electronic device, according to aspects of the disclosure.

In step 301, the electronic device detects that it is activated. In step 303, the electronic device detects its current position. In step 305, the electronic device detects whether the country of the current position is an activation limit country. For example, the electronic device may detect whether the country of the current position is included in a list of activation limit countries. In step 307, the electronic device shuts down in response to detecting that the country is in the list of activation limit countries. For example, when "South Korea" is included in a list of activation limit countries, the electronic device may shut down. Thus, in some implementations, the power supply of the electronic device can be turned off in response to the electronic device being present in an activation limit country. The list of activation limit countries may include a database, a table, a data structure, and/or any other suitable type of indication of whether a given country is an activation limit country.

In one example, the electronic device may perform a search for available communication networks and detect its current position. When a communication network is identified as a result of the search, the electronic device may detect the country where the current position is situated by using a provider identification code of the searched communication network.

In another example, when no communication network is identified as a result of the search, the electronic device may detect its current position using GPS. For instance, in some implementations, the electronic device may detect a coordinate value including latitude and longitude. In these implementations, when a coordinate value is 37° 33' 58.87" N 126° 58' 40.63" E, the electronic device may detect that a country of a current position is "South Korea". Herein, it may be assumed that the electronic device previously store country information about coordinate values.

In yet another example, when no communication network is identified as a result of the search, the electronic device may detect its current position by using local-area wireless communication. For instance, when a Wi-Fi communication is activated, the electronic device may search at least one AP through a communication unit and attempt to access the searched AP. Thereafter, the electronic device may receive one IP address through the accessed AP. For example, when the IP address is 152.149.83.2, the electronic device may detect that a country of a current position is "South Korea". Thus, in this example, the electronic device may detect that the country of the current position is "South Korea". In some implementations, the electronic device may store a mapping between different IP addresses and respective country identifiers so that it can determine what countries correspond to different IP addresses.

When the country where the electronic device is located is an activation limit country, the electronic device may shut down. For example, the electronic device may display, as shown in FIG. 8B, a menu 821 indicating that the electronic device is being shut down. In addition, the electronic device may display, as shown in FIG. 8B, an emergency call button 811 and a language change button 813.

Figure 4:
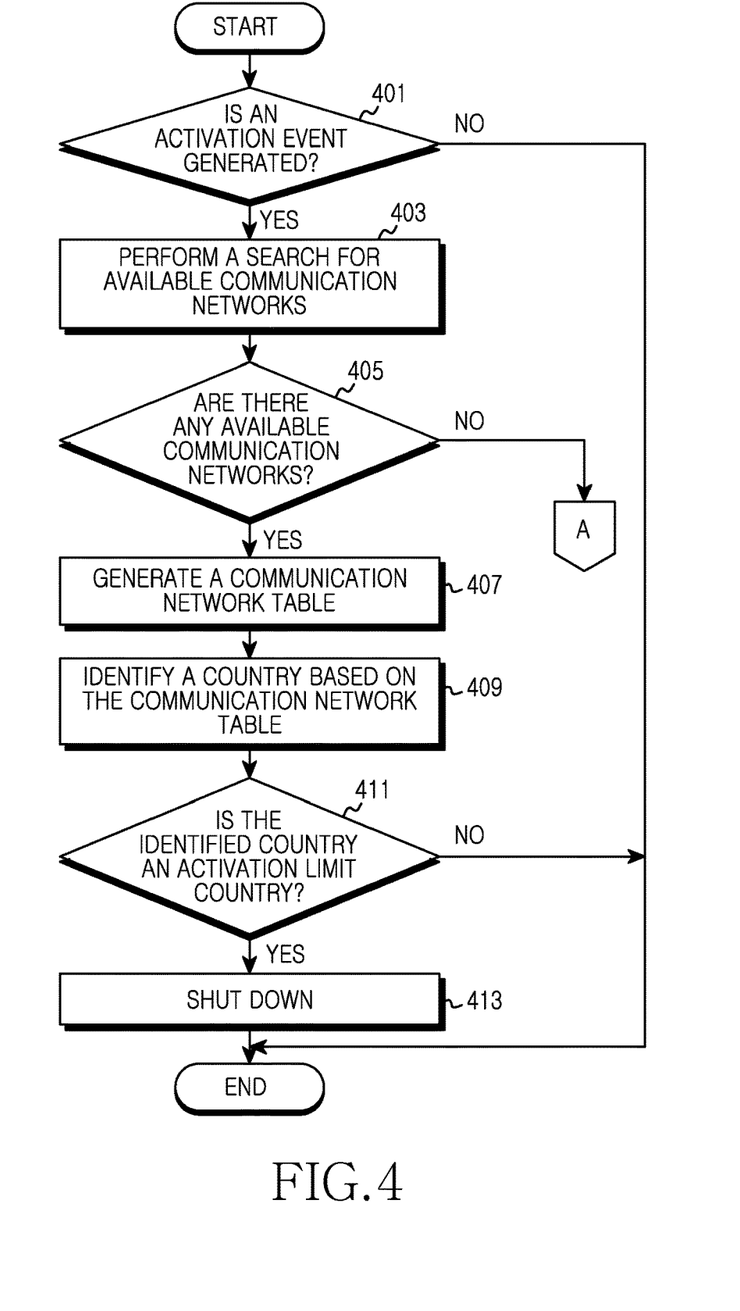

FIG. 4 is a flowchart illustrating another example of a process for restricting the operation of an electronic device, in accordance with aspects of the disclosure. In step 401, the electronic device detects whether an activation event is generated. In some implementations, the activation event may be an event that is generated when the electronic device is powered on. If the activation event is not generated, execution of the process may end. Alternatively, when the activation event is detected, the execution of the process may proceed to step 403.

In step 403, the electronic device performs a search to identify one or more networks that are available at the location of the electronic device. For example, the electronic device may search the communication network during a reference time through a communication unit. For example, the electronic device may display, as shown in FIG. 8A, a menu 801 for informing that a search for communication networks is being performed. Also, the electronic device may include, as shown in FIG. 8A, a cancel button 803. When the cancel button 803 is activated, the electronic device may stop the search. In some implementations, the electronic device may display an indication of remaining time until the search is complete in the cancel button 803. In addition, in some implementations, the electronic device may display, as shown in FIG. 8A, an emergency call button 811 and a language change button 813.

In step 405, the electronic device determines whether one or more networks are identified as a result of the search. For example, the electronic device may detect whether at least one communication network provider identification code is identified as a result of the search. The communication network provider identification code may include a country code and a provider information code. If one or more networks are identified as a result of the search, the process proceeds to step 407. Otherwise, when one or more networks are not identified as a result of the search, sub-process A is executed. Examples of sub-process A are provided with respect to FIGS. 7A and 7B.

In step 407, the electronic device creates a communication network table that includes information identified by the electronic device over the course of the search. For example, the electronic device may creates, as shown in Table 1 below, a communication network table including country codes, provider information codes and provider names.

TABLE 1

| Country code | Provider information code | Provider name |
|---|---|---|
| 450 | 02 | KT |
| 450 | 03 | Shinsegi Telecom, Inc. |
| 450 | 04 | KT |

TABLE 1-continued

| Country code | Provider information code | Provider name |
|---|---|---|
| 450 | 05 | SK Telecom |
| 450 | 06 | LG Telecom |
| 450 | 08 | KT |

In step 409, the electronic device detects the country where it is currently located by using the communication network table generated at step 407. For example, the electronic device may detect that its current position is "South Korea" based on country code "450" being identified in Table 1.

In some circumstances, multiple country codes can be detected by the electronic device at its current location. Table 2, which is presented below, is an example a communication network table that can be generated by the electronic device in such circumstances.

TABLE 2

| Country code | Provider information code | Provider name |
|---|---|---|
| 450 (South Korea) | 02 | KT |
| 450 (South Korea) | 03 | Shinsegi Telecom, Inc. |
| 450 (South Korea) | 04 | KT |
| 450 (South Korea) | 05 | SK Telecom |
| 450 (South Korea) | 06 | LG Telecom |
| 450 (South Korea) | 08 | KT |
| 450 (South Korea) | 11 | Korea Cable Telecom (t-plus), Eco-mobile |
| 467 (North Korea) | 05 | Cheo Technology Jv Company |
| 467 (North Korea) | 193 | Korea Posts and Telecommunications Corporation |

When multiple country codes are identified in the communication network table, the electronic device may select one of the country codes as corresponding to the country where the electronic device is currently located based on various criteria. The criteria may be based on relative counts of the different country codes in the communication network table, the signal strength of signals received from different identified communication networks, and/or any other suitable metric.

For example, the electronic device may detect that the country where it is currently located is "South Korea" based on the communication network table identify a greater number of networks having country code values "450" than networks having country code values of "467". Alternatively, the electronic device may compare the strength of signals from at least one detected communication network from a first country with the signal strength of at least one other communication network from a second country and detect that the electronic device is located in the first country based on the strength of the signals from the first network being higher than the strength of the signals from the second network.

In step 411, the electronic device determines whether the country where the electronic device is currently located is an activation limit country. For example, the electronic device may detect whether the country of the current position verified in step 409 is included in a list of activation limit countries. If the country is not an activation limit country, the execution of the process ends. Otherwise, when the country is an activation limit country, the execution of the process continues to step 413.

In step 413, the electronic device shuts down. For example, when "South Korea" is included in the list of activation limit countries, the electronic device may shut off its power supply. While doing so, the electronic device may display, as shown in FIG. 8B, a menu indicating that the electronic device is being shut down. In addition, the electronic device may display, as shown in FIG. 8B, an emergency call button 811 and a language change button 813.

Figure 5:
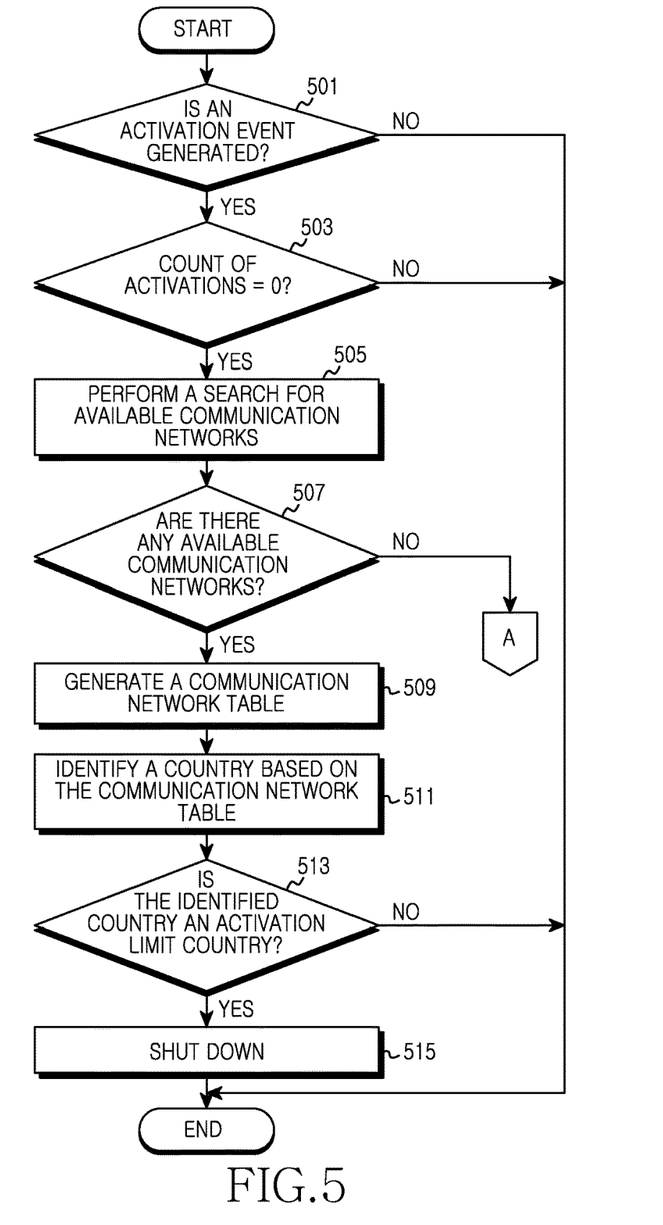

FIG. 5 is a flowchart illustrating yet another example of a process for restricting the operation of an electronic device, in accordance with aspects of the disclosure. In step 501, the electronic device detects whether an activation event is generated. If the activation event is not generated, the electronic device ends the process. Otherwise, the electronic device proceeds to step 503

In step 503, the electronic device detects whether the number of times the electronic device has been activated (e.g., powered on) over a predetermined period (e.g., the life of the electronic device, or a period starting after the electronic device is tested by its manufacturer) is greater than zero (0). That is, the electronic device may detect whether activation has been completed. If the number of times the electronic device has been activated is greater than zero (0) (or another threshold), the process ends. Otherwise the process proceeds to step 505.

In step 505, the electronic device performs a search for one or more communication networks that are available at the electronic device's location. For example, the electronic device may display, as shown in FIG. 8A, a menu 801, for informing that a search for communication networks is being performed. Also, the electronic device may include, as shown in FIG. 8A, a cancel button 803. When the cancel button 803 is activated, the electronic device may stop the search. In some implementations, the electronic device may display an indication of remaining time until the search is complete in the cancel button 803. In addition, the electronic device may display, as shown in FIG. 8A, an emergency call button 811 and a language change button 813.

In step 507, the electronic device determines whether one or more networks have been identified as a result of the search. For example, the electronic device may detect whether at least one communication network provider identification code is identified. The communication network provider identification code may include a country code and a provider information code. If one or more networks are identified as a result of the search, the process proceeds to step 509. Otherwise, when one or more networks are not identified as a result of the search, sub-process A is executed. Examples of sub-process A are provided with respect to FIGS. 7A and 7B.

In step 509, the electronic device creates a communication network table based on information collected over the course of the search. In some instances, step 509 may be performed in the same manner as discussed with respect to step 407.

In step 511, the electronic device detects the country where the electronic device is currently located based on the table generated in step 509. In some instances, step 511 may be performed in the same manner as discussed with respect to step 409.

In step 513, after identifying the country where the electronic device is located, the electronic device may detect whether the identified country is an activation limit country. For example, the electronic device may determine whether the country is included in a list of activation limit countries.

If the country is not an activation limit country, the process ends. Otherwise, if the country is an activation limit country, the process proceeds to step 515.

In step 515, the electronic device shuts down. For example, when "South Korea" is included in the list of activation limit countries, the electronic device may shut off its power supply. Herein, the electronic device may display, as shown in FIG. 8B, a menu 821 indicating that the electronic device is being shut down. In addition, the electronic device may display, as shown in FIG. 8B, an emergency call button 811 and a language change button 813.

Figure 6:
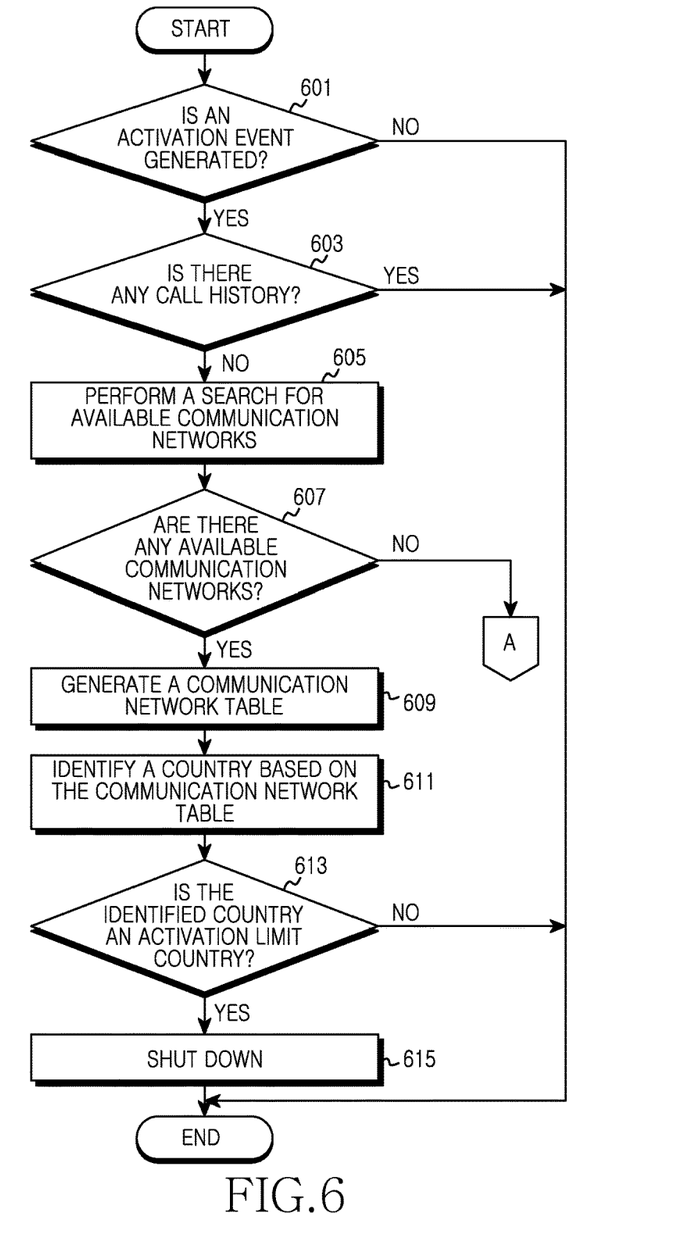

FIG. 6 is a flowchart illustrating yet another example of a process for restricting the operation of an electronic device, in accordance with aspects of the disclosure. In step 601, the electronic device may detect whether an activation event is generated. If the activation event is not generated, the process ends. Otherwise, if an activation event is generated, the process proceeds to step 603.

In step 603, the electronic device may detect whether the electronic device has an associated call history. In some implementations, the electronic device may be considered to possess associated call history when the electronic device is used to perform at least one of: receive one or more telephone calls, initiate one or more telephone calls, and/or conduct one or more phone calls. Additionally or alternatively, in some implementations, the electronic device may be considered to possess associated call history when the electronic device is used to perform at least one of: receive one or more non-emergency telephone calls, initiate one or more non-emergency telephone calls, and/or conduct one or more non-emergency phone calls. Thus, in the latter implementations, if the electronic device has been used to conduct emergency phone calls only, the electronic device may be considered to lack an associated call history. If the electronic device has an associated call history, the process ends. Otherwise, if the electronic device has no associated call history, the process proceeds to step 605.

In step 605, the electronic device may conduct a search to identify one or more communication networks that are available at the location where the electronic device is present. In some implementations, the electronic device may display, as shown in FIG. 8A, a menu 801 for informing that a search for communication networks is being performed. Also, the electronic device may include, as shown in FIG. 8A, a cancel button 803. When the cancel button 803 is activated, the electronic device may stop a search for a communication network on the menu 801. In some implementations, the electronic device may display an indication of remaining time until the search is complete on the cancel button 803. In addition, in some implementations, the electronic device may display, as shown in FIG. 8A, an emergency call button 811 and a language change button 813 on the display unit.

In step 607, the electronic device may detect whether one or more communication networks have been identified as a result of the search. For example, the electronic device may detect whether at least one communication network provider identification code is identified. The communication network provider identification code may include a country code and a provider information code. If one or more networks are identified as a result of the search, the process proceeds to step 609. Otherwise, when one or more networks are not identified as a result of the search, sub-process A is executed. Examples of sub-process A are provided with respect to FIGS. 7A and 7B.

In step 609, the electronic device creates a communication network table based on information collected over the course of the search. In some instances, step 609 may be performed in the same manner as discussed with respect to step 407.

In step 611, the electronic device detects the country where the electronic device is currently located based on the table generated in step 609. In some instances, step 611 may be performed in the same manner as discussed with respect to step 409.

In step 613, the electronic device may detect whether the country where the electronic device is currently present is an activation limit country. For example, the electronic device may determine whether the country is included in a list of activation limit countries. If the verified country is not an activation limit country, the process ends. Otherwise, if the country is an activation limit country, the process proceeds to step 615.

In step 615, the electronic device shuts down. For example, when "South Korea" is included in the activation limit countries, the electronic device may shut off its power supply. For instance, the electronic device may display, as shown in FIG. 8B, a menu 821 indicating that the electronic device is being shut down. In addition, the electronic device may display, as shown in FIG. 8B, an emergency call button 811 and a language change button 813.

Figure 7A:
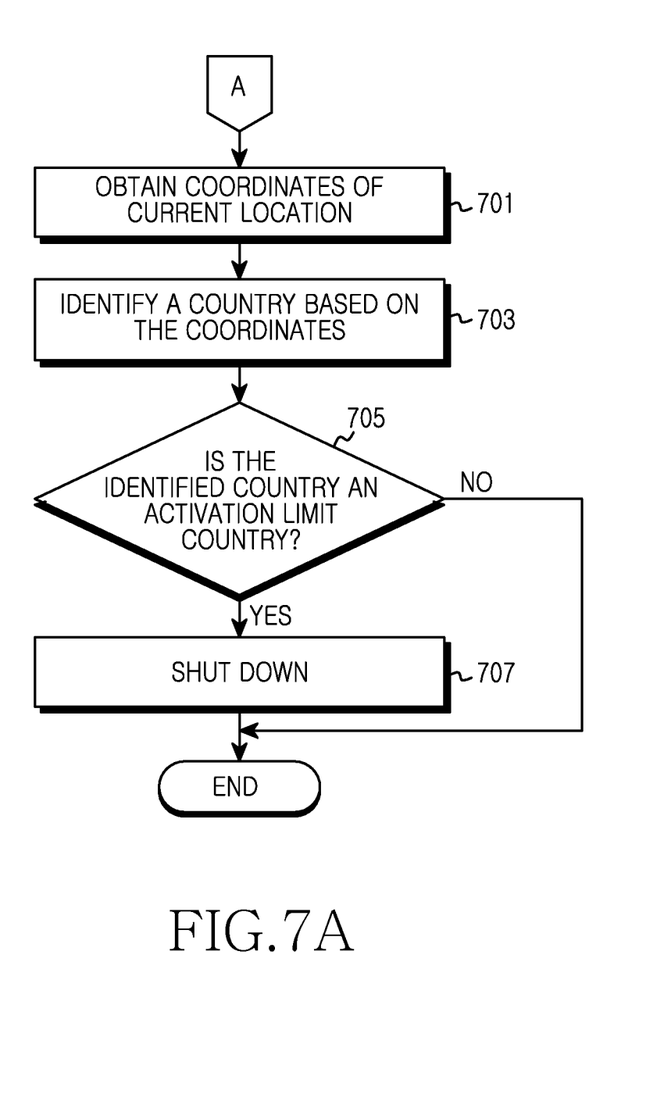
FIG. 7A and FIG. 7B are flowcharts illustrating different examples of a sub-process, in accordance with aspects of the disclosure.

FIG. 7A is a flowchart illustrating an example of a sub-process, in accordance with aspects of the disclosure.

In step 701, the electronic device may detect the coordinates of the location where the electronic device is currently present. The detection could be performed by using GPS, for example. Thus, in some implementations, the electronic device may identify a coordinate value including latitude and longitude.

In step 703, the electronic device may detect a country of its current position using the coordinate value. For example, when a coordinate value is 37° 33' 58.87" N 126° 58' 40.63" E, the electronic device may detect that a country corresponding to its current position is "South Korea". In some implementations, the determination may be performed based on a record stored in the memory of the electronic device that maps country identifiers to respective coordinate values that correspond to locations within the countries' territories.

In step 705, the electronic device may detect whether the country is an activation limit country. For example, the electronic device may detect whether the country is included in a list of activation limit countries. If the country is not an activation limit country, the process ends. Otherwise, if the country is an activation limit country, the process proceeds to step 707.

In step 707, the electronic device shuts down. For example, when "South Korea" is included in the list of activation limit countries, the electronic device may shut off its power supply. Herein, the electronic device may display on a display unit, as shown in FIG. 8B, a menu 821 indicating that the electronic device is being shut down. In addition, the electronic device may display, as shown in FIG. 8B, an emergency call button 811 and a language change button 813.

Figure 7B:
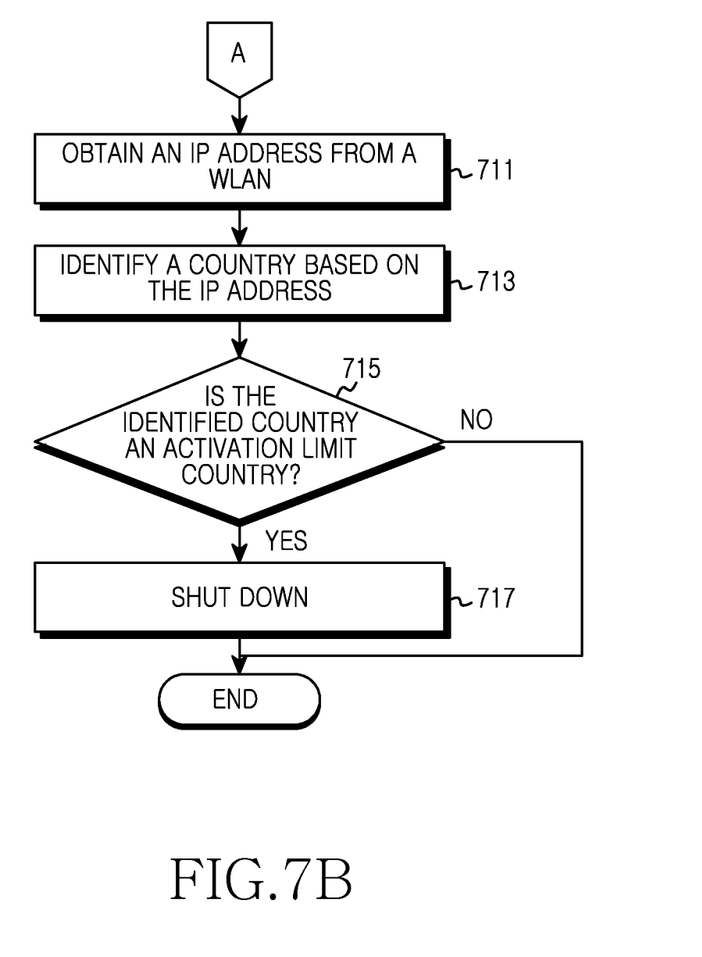

FIG. 7B is a flowchart illustrating an example of a sub-process, in accordance with aspects of the disclosure.

In step 711, the electronic device may detect an IP address using local-area wireless communication network. The local area wireless communication network may include a wireless LAN, a Bluetooth communication network or channel, an NFC network, a Zigbee communication network, and/or any other suitable type of network. For example, when a Wi-Fi communication capability of the electronic device is in an activated state, the electronic device may identify at least one access point (AP) and attempt to access the searched AP. Thereafter, the electronic device may receive an IP address through the accessed AP.

In step 713, the electronic device may identify the country where the electronic device is located based on the IP address. For example, when the IP address obtained in step 711 is 152.149.83.2, the electronic device may determine that the country where the electronic device is located is "South Korea". In some implementations, the determination may be based on data that is stored in the memory of the electronic device that maps IP addresses to identifiers of corresponding countries.

In step 715, the electronic device may detect whether the country where the electronic device is located is an activation limit country. For example, the electronic device may detect whether the country is included in a list of activation limit countries. If the verified country is not the activation limit country, the process ends. Otherwise, if the verified country is an activation limit country, the process proceeds to step 717.

In step 717, the electronic device shuts down. For example, when "South Korea" is included in the activation limit countries, the electronic device may shut off the power supply. For example, the electronic device may display, as shown in FIG. 8B, a menu 821 indicating that the electronic device is being shut down. In addition, the electronic device may display, as shown in FIG. 8B, an emergency call button 811 and a language change button 813.

As described above, there is an advantage in that the electronic device may limit activation for sale/distribution/import prohibition countries by detecting the country of the current position when the activation event is generated and controlling the shutting-off of the power supply.

It will be appreciated that aspects of the present disclosure according to the claims and description in the specification may be realized in the form of hardware, software, or a combination of hardware and software. The flowcharts presented in FIGS. 3-7B are provided as examples only. One or more of the steps in these flowcharts may be executed in a different order, executed concurrently, or altogether omitted.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to exemplary aspects thereof, it will be understood by those skilled in the art that various changes in form and details may be made therein without departing from the spirit and scope of the present disclosure as defined by the appended claims.

What is claimed is:

1. A method comprising:
   detecting an activation of an electronic device, wherein the activation indicates that the electronic device is switched from a power-off state to a power-on state, and updating a recorded number of activations of the electronic device to increase by one in response to the detection of the activation of the electronic device;
   determining whether the recorded number of activations of the electronic device before the updating is greater than zero;
   determining whether the electronic device has a non-emergency call history, wherein the non-emergency call history is unrelated to an emergency call made via an emergency call button displayed on a screen of the electronic device; and
   if the recorded number of activations of the electronic device is not greater than zero, and if the electronic device does not have the non-emergency call history:
   detecting a plurality of communication networks available to communicate with the electronic device;
   in response to the detection of the available communication networks, generating a table including information associated with the available communication networks;
   determining a current location of the electronic device based on the table;
   determining whether the activation is prohibited at the current location of the electronic device; and
   terminating the activation of the electronic device when the activation is prohibited at the current location, thereby causing the electronic device to power off.

2. The method of claim 1, wherein the current location of the electronic device is detected based on a country code stored in the table.

3. The method of claim 1, wherein the current location of the electronic device is detected based on a provider identification code stored in the table.

4. The method of claim 1, further comprising detecting coordinates corresponding to the current location of the electronic device via a global positioning system (GPS) when at least one available communication network is not detected.

5. The method of claim 4, wherein determining whether the activation is prohibited at the current location of the electronic device comprises detecting whether the coordinates are included in a list associated with predefined coordinates in which the activation of the electronic device is prohibited.

6. The method of claim 1, further comprising:
   connecting to a wireless local area network (WLAN) when at least one available communication network is not detected, wherein the WLAN is a different type from the least one communication network;
   receiving an Internet Protocol (IP) address from the WLAN; and
   detecting the current location based on the IP address.

7. The method of claim 6, determining whether the activation is prohibited at the current location of the electronic device comprises detecting whether the IP address is included in a list associated with predefined IP addresses in which the activation of the electronic device is prohibited.

8. The method of claim 1, wherein determining a current location of the electronic device based on the table comprises:
   obtaining locations from the communication networks; and
   determining a largest number of identical locations as the current location.

9. The method of claim 1, wherein determining a current location of the electronic device based on the table comprises:
   detecting signal strengths of the communication networks;
   selecting a communication network, having a highest signal strength, among the communication networks; and
   determining the current location based on the selected communication network.

10. The method of claim 1, wherein the plurality of communication networks includes cellular networks.

11. An electronic device comprising a memory and a processor configured to:
    detect an activation of the electronic device, wherein the activation indicates that the electronic device is switched from a power-off state to a power-on state, and update a recorded number of activations of the electronic device to increase by one in response to the detection of the activation of the electronic device;
    determine whether the recorded number of activations of the electronic device before the updating is greater than zero;
    determine whether the electronic device has a non-emergency call history, wherein the non-emergency call history is unrelated to an emergency call made via an emergency call button displayed on a screen of the electronic device; and
    if the recorded number of activations of the electronic device is not greater than zero, and if the electronic device does not have the non-emergency call history:
    detect a plurality of communication networks available to communicate with the electronic device;
    in response to the detection of the available communication networks, generate a table including information associated with the available communication networks;
    determine a current location of the electronic device based on the table;
    determine whether the activation is prohibited at the current location of the electronic device; and
    terminate the activation of the electronic device when the activation is prohibited at the current location, thereby causing the electronic device to power off.

12. The electronic device of claim 11, wherein the current location of the electronic device is detected based on a country code stored in the table.

13. The electronic device of claim 12, wherein the current location of the electronic device is detected also based on a provider identification code stored in the table.

14. The electronic device of claim 11, wherein the processor is further configured to detect coordinates corresponding to the current location of the electronic device via a global positioning system (GPS) when at least one available communication network is not detected.

15. The electronic device of claim 14, wherein the processor is configured to detect whether the coordinates are included in a list associated with predefined coordinates in which the activation of the electronic device is prohibited.

16. The electronic device of claim 11, the processor is further configured to:
   connect to a wireless local area network (WLAN) when at least one available communication network, wherein the WLAN is a different type from the least one communication network;
   receive an Internet Protocol (IP) address from the WLAN; and
   detect the current location based on the IP address.

17. The electronic device of claim 16, wherein the processor is configured to detect whether the IP address is included in a list associated with predefined IP addresses in which the activation of the electronic device is prohibited.

18. The electronic device of claim 11, wherein the processor configured to:
   obtain locations from the communication networks; and
   determine a largest number of identical locations as the current location.

19. The electronic device of claim 11, wherein the processor configured to:
   detect signal strengths of the communication networks;
   select a communication network, having a highest signal strength, among the communication networks; and
   determine the current location based on the selected communication network.

20. The electronic device of claim 11, wherein the plurality of communication networks includes cellular networks.

\* \* \* \* \*